United States Patent
Yeo et al.

(10) Patent No.: US 7,830,488 B2
(45) Date of Patent: Nov. 9, 2010

(54) LIQUID CRYSTAL DISPLAY

(75) Inventors: Yong-Suk Yeo, Jecheon-si (KR);
Jae-Hyun Kim, Suwon-si (KR);
Seung-Kyu Lee, Suwon-si (KR);
Won-Sang Park, Yongin-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 805 days.

(21) Appl. No.: 11/675,300

(22) Filed: Feb. 15, 2007

(65) Prior Publication Data
US 2007/0285600 A1    Dec. 13, 2007

(30) Foreign Application Priority Data
Jun. 13, 2006  (KR) ............... 10-2006-0052982
Jun. 30, 2006  (KR) ............... 10-2006-0060566

(51) Int. Cl.
*G02F 1/1343* (2006.01)
(52) U.S. Cl. .................... 349/144; 349/39
(58) Field of Classification Search ............ 349/39, 349/144
See application file for complete search history.

(56) References Cited

U.S. PATENT DOCUMENTS 6,927,807 B2* 8/2005 Kim et al. ............. 349/38
7,593,088 B2* 9/2009 Kim et al. ............. 349/155
2005/0195353 A1* 9/2005 Park et al. ............. 349/139
2008/0123010 A1* 5/2008 Park et al. ............. 349/46
2010/0128191 A1* 5/2010 Park et al. ............. 349/43

FOREIGN PATENT DOCUMENTS

| JP | 11-149076 | 6/1999 |
|---|---|---|
| JP | 2001-272696 | 10/2001 |
| JP | 2003-008026 | 1/2003 |
| JP | 2005-292302 | 10/2005 |
| KR | 1020040011867 | 2/2004 |
| KR | 1020040062376 | 7/2004 |
| KR | 1020050003898 | 1/2005 |
| KR | 1020050028179 | 3/2005 |

* cited by examiner

*Primary Examiner*—Uyen-Chau N Le
*Assistant Examiner*—John M Bedtelyon
(74) *Attorney, Agent, or Firm*—F. Chau & Associates LLC

(57) ABSTRACT

A liquid crystal display includes: a first substrate; a gate line formed on the first substrate; a data line intersecting the gate line; a thin film transistor connected to the gate line and to the data line; a pixel electrode electrically connected to the thin firm transistor, including first and second sub-electrodes, and overlapping with a portion of the data line; a storage electrode line formed on the first substrate, disposed between the first and second sub-electrodes, and including an overlapped portion with the pixel electrode; a second substrate arranged facing the first substrate; a common electrode formed on the second substrate and including a cutout corresponding to the first and second sub-electrodes; and a liquid crystal layer formed between the common electrode and the pixel electrode.

15 Claims, 10 Drawing Sheets

LIQUID CRYSTAL DISPLAY

CROSS-REFERENCE TO RELATED PATENT APPLICATIONS

This application claims priority to Korean Patent Application Nos. 10-2006-0052982, filed on Jun. 13, 2006, and 10-2006-0060566, filed on Jun. 30, 2006, the contents of which are herein incorporated by reference in their entirety.

BACKGROUND OF THE INVENTION

1. Technical Field

The present disclosure relates to a liquid crystal display.

2. Discussion of Related Art

Liquid crystal displays (LCDs) are one of the most widely used flat panel displays. A typical liquid crystal display includes two panels provided with pixel electrodes and a common electrode (commonly referred to as "field generating electrodes") and having a liquid crystal layer interposed between the two panels.

An electric field is generated in the liquid crystal layer in response to a voltage applied to the field generating electrodes. When an electric field is applied, the liquid crystal molecules of the liquid crystal layer change their orientations. LCDs display images by controlling the strength of the electric field, which determines orientations of the liquid crystal molecules to adjust the polarization of incident light. Light transmittance is determined by phase retardation due to the birefringence of the liquid crystal layer. The phase retardation is a result of multiplying cell thickness and a refractive index anisotropy value of the liquid crystal layer.

In conventional LCDs, one panel typically includes a plurality of pixel electrodes and thin film transistors (TFTs) as switching devices for switching on/off voltages to be applied to the pixel electrodes, and the other panel includes a common electrode and a color filter.

A liquid crystal display does not generate any light itself. Non-emissive display devices such as a liquid crystal display require a light source, such as for example, a backlight. Alternatively, the liquid crystal display passes light, for example, natural light, through a liquid crystal layer and then re-passes reflected light through the liquid crystal layer, thereby displaying images.

Light leakage may occur in a liquid crystal display when an orientation of liquid crystal molecules is distorted. Liquid crystal display devices may include black matrix layers to prevent light leakage that may occur in the areas between the pixels.

SUMMARY OF THE INVENTION

According to an exemplary embodiment of the present invention, a liquid crystal display includes: a first substrate; a gate line formed on the first substrate; a data line intersecting the gate line; a thin film transistor electrically connected to the gate line and to the data line; a pixel electrode electrically connected to the thin film transistor, including first and second sub-electrodes, and overlapping with a portion of the data line; a storage electrode line formed on the first substrate, disposed between the first and second sub-electrodes, and including an overlapped portion with the pixel electrode; a second substrate arranged facing the first substrate; a common electrode formed on the second substrate and including a cutout corresponding to the first and second sub-electrodes, and a liquid crystal layer formed between the common electrode and the pixel electrode. The first and second sub-electrodes may have a quadrangle shape having rounded corners.

According to an exemplary embodiment of the present invention a liquid crystal display includes a light blocking member formed on the second substrate and corresponding to the thin firm transistor.

According to an exemplary embodiment of the present invention, a liquid crystal display includes a light blocking member formed on the second substrate and corresponding to the gate line.

According to an exemplary embodiment of the present invention, a liquid crystal display includes a column spacer formed on the second substrate and supporting the first and second substrates.

According to an exemplary embodiment of the present invention, a liquid crystal display includes an assistant light blocking member corresponding to the column spacer and formed on the second substrate.

A width of the assistant light blocking member may be about 8 μm to about 10 μm greater than a largest width of the column spacer.

The column spacer may be disposed on a portion in which the storage electrode line and the data line are intersected.

According to an exemplary embodiment of the present invention, a liquid crystal display includes a plurality of color filters disposed under the common electrode.

The thin film transistor may include a gate electrode connected to the gate line, a semiconductor overlapping with the gate electrode, a drain electrode formed on the semiconductor, and a source electrode facing the drain electrode and connected to the data line, on the semiconductor.

The drain electrode may include an extending portion overlapping with the storage electrode line.

The first and second sub-electrodes may be electrically connected to each other by a connecting member. The connecting member may include a substantially vertical portion connecting the first and second sub-electrodes in a row, and a protruding portion leftwardly and rightwardly protruded from the substantially vertical portion and connected to the extending portion of the drain electrode.

An area of the first sub-electrode may be substantially identical to an area of the second sub-electrode.

A distance between adjacent pixel electrodes may be about 4 μm to about 7 μm.

According to an exemplary embodiment of the present invention, a liquid crystal display includes: a thin film transistor panel; a common electrode panel arranged facing the thin film transistor panel; a liquid crystal layer formed between the common electrode panel and the thin film transistor panel, wherein the thin film transistor panel includes a first substrate, a gate line formed on the first substrate, a data line intersecting the gate line, a thin film transistor electrically connected to the gate line and to the data line, and a pixel electrode electrically connected to the thin film transistor and including first and second sub-electrodes, and wherein the common electrode panel includes a second substrate arranged facing the first substrate and a common electrode formed on the second substrate and including a cutout corresponding to the first and second sub-electrodes.

BRIEF DESCRIPTION OF THE DRAWINGS

The present invention will become readily apparent to those of ordinary skill in the art when descriptions of exemplary embodiments thereof are read with reference to the accompanying drawings.

DESCRIPTION OF EXEMPLARY EMBODIMENTS

Figure 1:
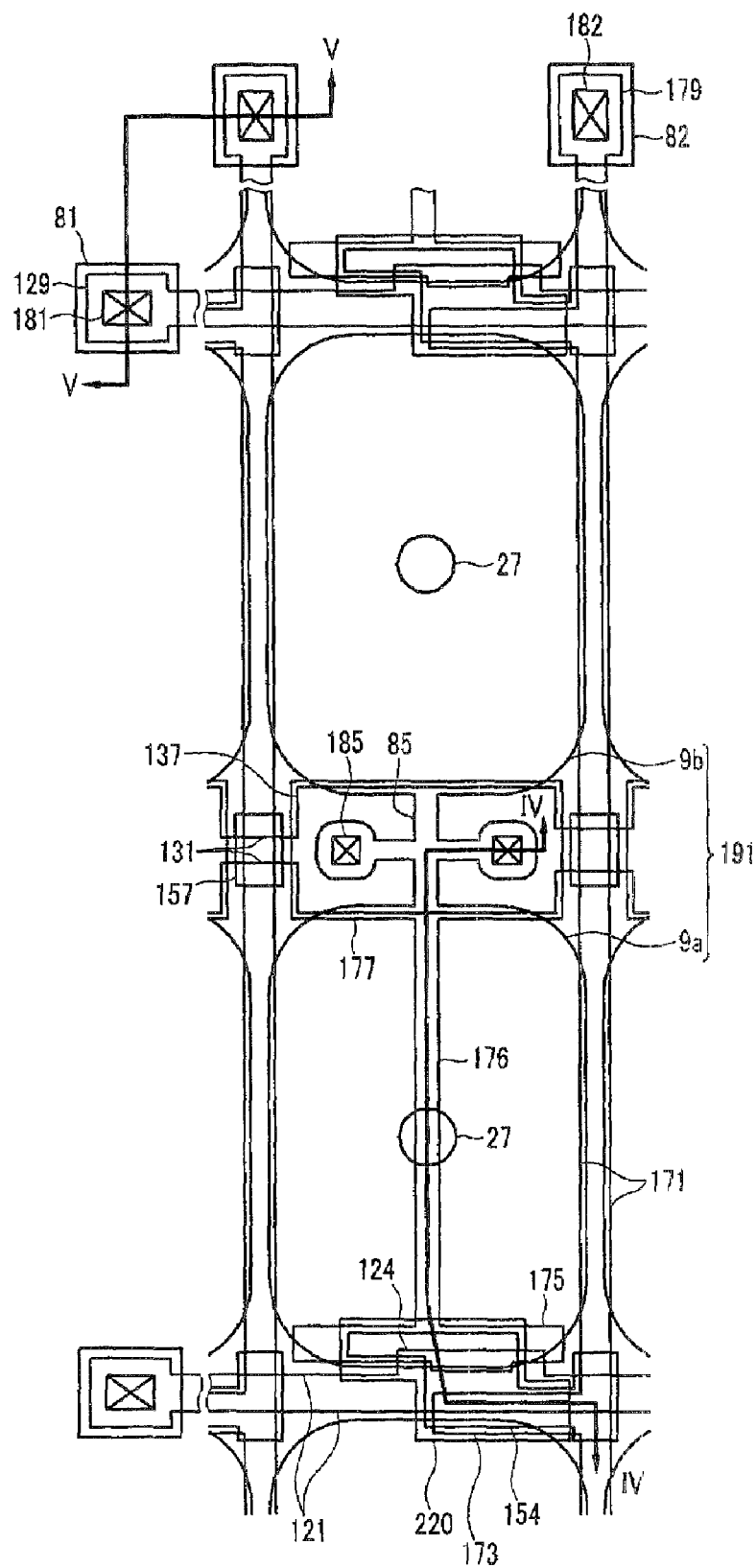
FIG. 1 is a layout view of a liquid crystal display according to an exemplary embodiment of the present invention.

Hereinafter, exemplary embodiments of the present invention will be described in detail with reference to the accompanying drawings. In the drawings, the thickness of layers, films, panels, regions, etc., may be exaggerated for clarity. Like reference numerals refer to similar or identical elements throughout the description of the figures. It will be understood that when an element such as a layer, film, region, or substrate is referred to as being "on" another element, it can be directly on the other element or intervening elements may also be present.

Hereinafter, a liquid crystal display according to an exemplary embodiment of the present invention will be described with reference to FIGS. 1 through 5.

Figure 2:
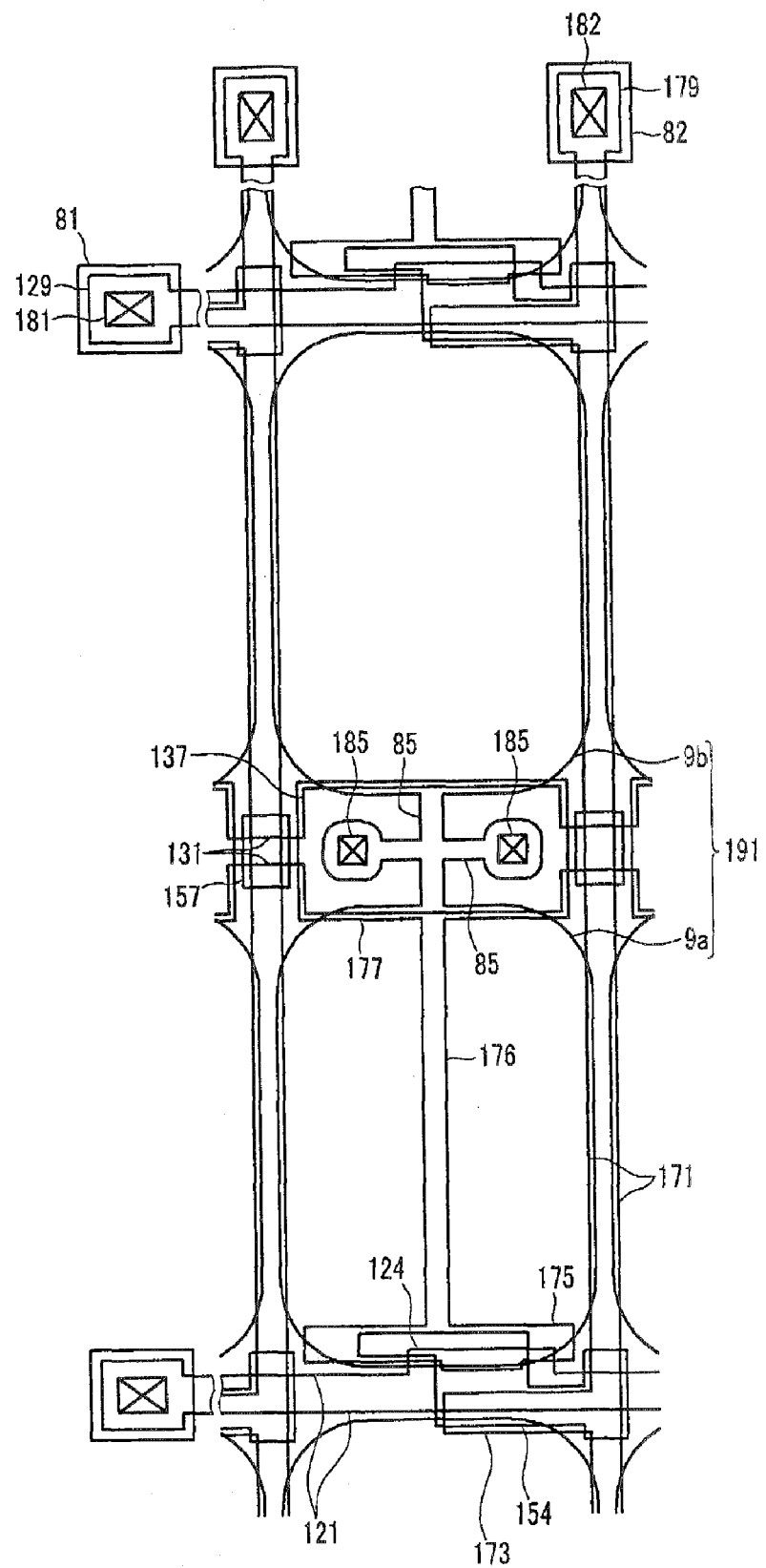
FIG. 2 is a layout view of a thin film transistor panel of the liquid crystal display shown in FIG. 1, according to an exemplary embodiment of the present invention.
Figure 3:
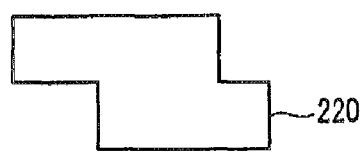
FIG. 3 is a layout view of a common electrode of the liquid crystal display shown in FIG. 1, according to an exemplary embodiment of the present invention.
Figure 3:
Figure 3:
Figure 3:
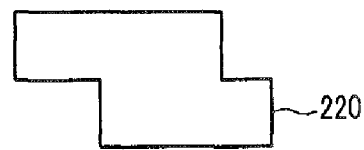
Figure 4:
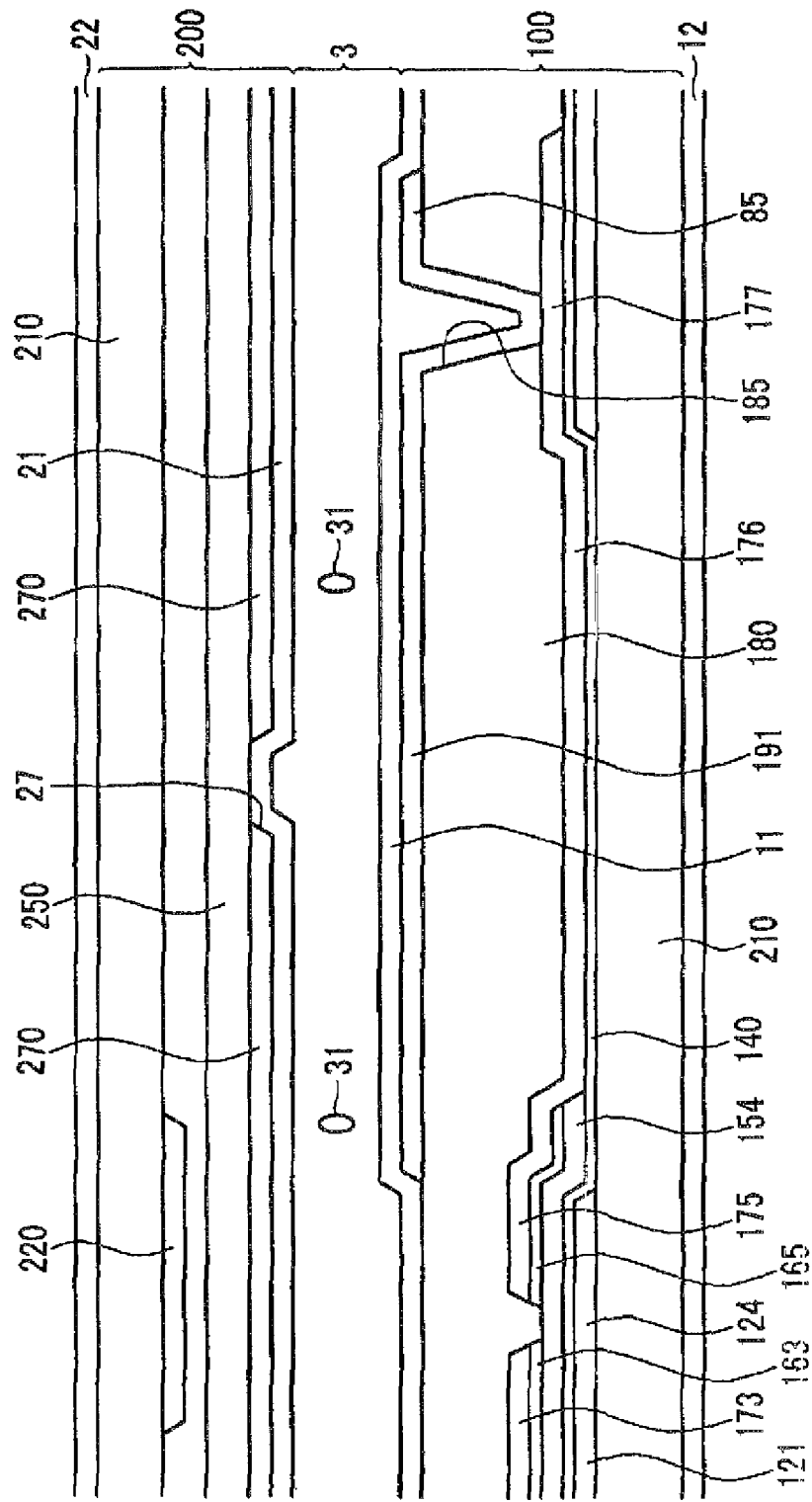
FIG. 4 is a cross-sectional view of the liquid crystal display shown in FIG. 1 taken along a line IV-IV.
Figure 5:
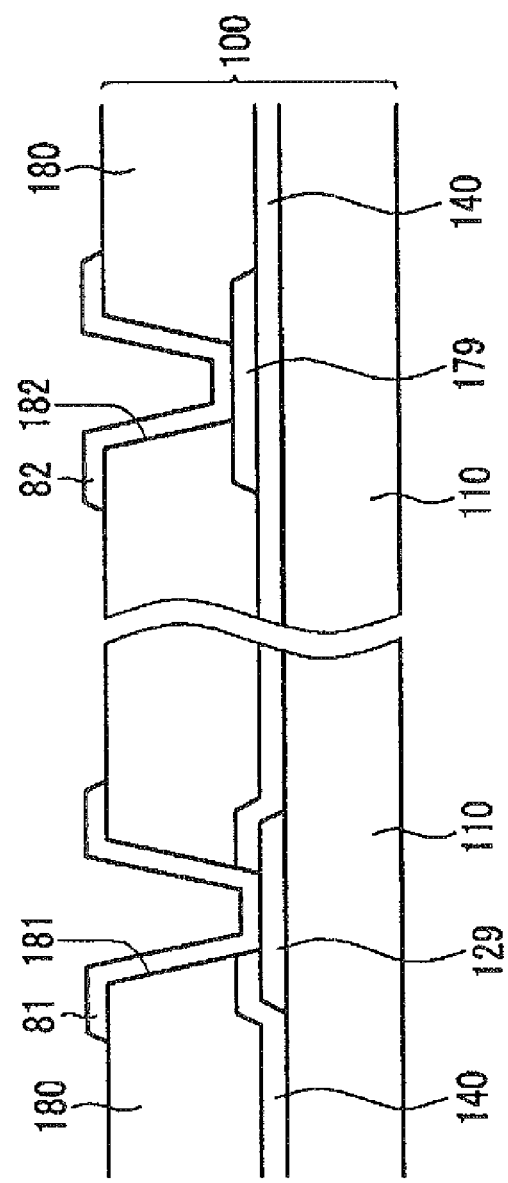
FIG. 5 is a cross-sectional view of the liquid crystal display shown in FIG. 1, taken along a line V-V.

FIG. 1 is a layout view of a liquid crystal display according to an exemplary embodiment of the present invention. FIG. 2 is a layout view of a thin film transistor panel of the liquid crystal display shown in FIG. 1, according to an exemplary embodiment of the present invention. FIG. 3 is a layout view of a common electrode of the liquid crystal display shown in FIG. 1, according to an exemplary embodiment of the present invention. FIG. 4 is a cross-sectional view of the liquid crystal display shown in FIG. 1, taken along a line IV-IV.

Referring to FIG. 1 to FIG. 5, a liquid crystal display according to an exemplary embodiment of the present invention includes a thin film transistor panel 100 and common electrode panel 200 arranged facing each other, and a liquid crystal layer 3 interposed between the panels 100 and 200.

Hereinafter a thin film transistor panel 100 according to an exemplary embodiment of the present invention will be described with reference to FIGS. 1, 2, 4 and 5.

Referring to FIG. 1, FIG. 2, FIG. 4, and FIG. 5, a plurality of gate lines 121 and a plurality of storage electrode lines 131 are formed on an insulation substrate 110. The insulation substrate 110 may comprise transparent glass or plastic.

Each gate line 121 transfers gate signals and may extend substantially horizontally. Each gate line 121 includes a plurality of gate electrodes 124 protruding upwardly and an enlarged end portion 129 for providing electrical connection to other layers or an external driving circuit. A gate driving circuit (not shown) for generating the gate signal may be installed on a flexible printed circuit film (not shown) attached on the substrate 110, may be directly installed on the substrate 110, or may be integrated on the substrate 110. In the case that the gate driving circuit is directly integrated on the substrate 110 the gate line 121 can extend for providing electrical connection to the gate driving circuit directly.

The storage electrode lines 131 are supplied with a predetermined voltage and may extend substantially in parallel with the gate lines 121.

Each of the storage electrode lines 131 may include the storage electrode 137.

The gate lines 121 and the storage electrode lines 131 may be formed from an aluminum-group metal such as aluminum (Al) or an aluminum alloy, a silver group metal such as silver (Ag) or a silver alloy, a copper group metal such as copper (Cu) or a copper alloy, a molybdenum group metal such as molybdenum (Mo) or a molybdenum alloy, chromium (Cr), tantalum (Ta), or titanium (Ti). The gate line 121 may have a multilayer structure such as for example, two conductive layers (not shown), wherein physical properties of the conductive layers may be different from each other. For example, a conductive layer may be formed from a low resistivity metal to reduce signal delay or voltage drop, such as an aluminum group metal, a silver group metal, or a copper group metal. A conductive layer may be formed from a first material having excellent physical, chemical and/or electrical contact characteristics with respect to a second material. For example, the second material may comprise indium tin oxide (ITO) and/or indium zinc oxide (IZO). The first material may comprise molybdenum group metal, chromium, tantalum, and/or titanium. In the case of two conductive layers, one layer may comprise a chromium layer and a second layer may comprise an aluminum (alloy) layer, or one layer may comprise an aluminum (alloy) layer and the second layer may comprise a molybdenum (alloy) layer. It will be understood that the gate lines 121 and the storage electrode lines 131 may be formed of various metals and/or conductive materials.

The side surface of the gate lines 121 and the storage electrode lines 131 may be inclined with respect to the surface of the substrate 110. For example, the inclined angle may be about 30° to about 80°.

A gate insulating layer 140 is formed on the gate lines 121 and the storage electrode lines 131, For example, the gate insulating layer 140 may comprise silicon nitride (SiNx) and/or silicon oxide (SiOx).

A plurality of semiconductor islands 154 and 157 are formed on the gate insulating layer 140. The semiconductor islands 154 and 157 may comprise hydrogenated amorphous silicon (where amorphous silicon is abbreviated as a-Si) or polysilicon. A semiconductor island 154 is disposed on the gate electrode 124. A semiconductor island 157 overlaps with the storage electrode line 131.

In an exemplary embodiment of the present invention, a plurality of ohmic contact island members 163 and 165 are formed on the semiconductor 154. The ohmic contact members 163 and 165 may be formed from various materials, such as for example, silicide or n+ hydrogenated amorphous silicon on which an n-type impurity such as phosphorus is doped in a high concentration. The ohmic contact members 163 and 165 form a pair. Each pair of the ohmic contact members 163 and 165 is respectively disposed on the semiconductor 154. An ohmic contact island member (not shown) may be formed on a portion of the semiconductor island 157 that overlaps with the storage electrode line 131.

The side surfaces of the semiconductors 154 and 157 and the ohmic contact members 163 and 165 may be inclined with respect to the surface of the substrate 110. For example, the inclined angle may be about 30° to about 80°.

A plurality of data lines 171 and a plurality of drain electrodes 175 are formed on the ohmic contact members 163 and 165 and the gate insulating layer 140.

Each data line 171 transfers a data signal and may extend in a substantially vertical direction, while intersecting the gate lines 121 and the storage electrode lines 131. Each data line 171 includes a plurality of source electrodes 173 extending toward the gate electrodes 124 and an enlarged end portion 179 for providing electrical connection to another layer or an external driving circuit. A data driving circuit (not shown) for generating the data signal may be installed on a flexible printed circuit film (not shown) attached on the substrate 110, may be directly installed on the substrate 110, or may be integrated on the substrate 110. In the case that the data driving circuit is directly integrated in the substrate 110, the data line 171 may extend and electrically connect to the data driving circuit.

The drain electrode 175 is disposed separated from the data line 171 and is arranged facing the source electrode 173 with the gate electrode 124 disposed therebetween. The drain electrode 175 is electrically connected to a connecting member 176 and an extending portion 177 overlapping with a storage electrode 137. A gate electrode 124, source electrode 173, and drain electrode 175, along with the semiconductor 154, form a thin film transistor (TFT). The thin film transistor includes a channel formed on the semiconductor 154 between the source electrode 173 and the drain electrode 175.

The data line 171 and the drain electrode 175 may be formed from a refractory metal, such as for example, molybdenum, chromium, tantalum, titanium, and/or alloys thereof. The data line 171 and the drain electrode 175 may have a multilayer structure including a refractory metal layer (not shown) and/or a low resistance conductive layer (not shown). For example, a multilayer structure may comprise a dual layer including a chromium or molybdenum (alloy) layer and an aluminum (alloy) layer and/or a triple layer including a molybdenum (alloy) layer, an aluminum (alloy) layer, and a molybdenum (alloy) layer. It is to be understood that the data lines 171 and the drain electrodes 175 may be formed from various metals and/or conductive materials.

The side surfaces of the data line 171 and drain electrode 175 may be inclined with respect to the surface of the substrate 110, and the inclined angle may be about 30° to about 80°.

In an exemplary embodiment of the present invention, the ohmic contact members 163 and 165 are formed only between the semiconductor 154 at the lower side and the data line 171 and drain electrodes 175 at the upper side and may reduce contact resistance between them. The widths of the semiconductor islands 154 and 157 may be enlarged at a portion meeting the gate line 121 and the storage electrode line 131, and a surface profile thereof may be substantially smooth, and shorts of the data line 171 may be prevented. The semiconductor 154 includes exposed portions, such as for example, an exposed portion between the source electrode 173 and the drain electrode 175, or an exposed portion that is not covered by the data line 171 and the drain electrode 175.

A passivation layer 180 is formed on the data line 171, the drain electrode 175, and the exposed portion of the semiconductor 154.

The passivation layer 180 may be formed from an inorganic insulating material or an organic insulating material, and may be substantially flat. The inorganic insulating material may comprise, for example, silicon nitride or silicon oxide. The organic insulating material may comprise a photosensitive material, which may have a dielectric constant of about 4.0 or less. The passivation layer 180 may have a dual-layer structure having a lower inorganic layer and an upper organic layer, and may prevent the exposed semiconductor 154 from being damaged.

A plurality of contact holes 182 and 185 for exposing the end portions 179 of the data lines 171 and the drain electrodes 175, respectively, are formed on the passivation layer. A plurality of contact holes 181 for exposing the end portions 129 of the gate lines 121 are formed on the passivation layer 180 and the gate insulating layer 140.

A plurality of pixel electrodes 191, a plurality of connecting members 85, and a plurality of contact assisting members 81 and 82 are formed on the passivation layer 180. The pixel electrodes 191 may comprise indium zinc oxide (IZO) and/or indium tin oxide (ITO)

Each pixel electrode 191 includes first and second sub-electrodes 9a and 9b, which may have rounded corners of quadrangles. The first and second sub-electrodes 9a and 9b are connected to each other by a connecting member 85.

The connecting member 85 includes a substantially vertical portion connecting the first and second sub-electrodes 9a and 9b, and a protruding portion leftwardly and rightwardly protruded from the substantially vertical portion.

The protruding portion of the connecting member 85 which may be physically and electrically connected to the extending portion 177 through the contact hole 185, receives a data voltage from the drain electrode 175 to transfer the data voltage to the pixel electrode 191.

The pixel electrodes 191 to which the data voltage is applied, along with a common electrode 270 of the common electrode panel 200 to which a common voltage is applied, form an electric field, thereby determining the orientation of the liquid crystal molecules of the liquid crystal layer 3 disposed between the electrodes 191 and 270. According to the orientation direction of the liquid crystal molecules, the polarization of the light passing though the liquid crystal layer 3 changes. The pixel electrodes 191 and the common electrode 270 comprise capacitors and hold the supplied voltage after the thin film transistor is turned off.

The distance between adjacent pixel electrodes 191 may be, for example, about 4 μm to about 7 μm. When the distance between the pixel electrodes 191 is greater than about 4 μm, light leakage due to disclination may be reduced. The disclination occurs due to a fringe field between the pixel electrodes.

The contact assisting members 81 and 82 are connected to the end portion 129 of the gate line 121 and the end portion 179 of the data line 171 through the contact holes 181 and 182, respectively. The contact assisting members 81 and 82 have a function of compensation for adhesiveness of the end portions 129 of the gate lines 121 and the end portions 179 of the data lines 171 to external apparatuses and of protecting these portions.

Hereinafter a common electrode panel 200 according to an exemplary embodiment of the present invention will be described with reference to FIGS. 1, 3, 4 and 5.

Referring to FIG. 1, FIG. 3 to FIG. 5, a light blocking member 220 is formed on an insulation substrate 210. The insulation substrate 210 may comprise transparent glass or plastic. The light blocking member 220 may be a black matrix, and corresponds to a thin film transistor.

A plurality of color filters 230 are formed on the substrate 210. Each color filter 230 extends in a substantially vertical direction along the pixel electrode 191 and forms a stripe pattern. Each color filter 230 may represent one of three primary colors, such as red, green, and blue.

An overcoat 250 is formed on the color filters 230. For example, overcoat 250 may be formed from an (organic) insulating material. The overcoat 250 may prevent the color filter 230 from being exposed, and may provide a substantially even surface.

The common electrode 270 is formed on the overcoat 250. The common electrode 270 may be formed from a transparent conductor, such as for example, ITO or IZO.

A plurality of circular cutouts 27 are formed on the common electrode 270. Each cutout 27 corresponds to central portions of the sub-electrodes 9a and 9b.

Alignment layers 11 and 21 are deposited on insides of the panels 100 and 200, respectively. The alignment layers 11 and 21 may be vertical alignment layers. Polarizers 12 and 22 are installed on outsides of the panels 100 and 200, respectively. The polarization axes of the two polarizers 12 and 22 may be substantially perpendicular to each other.

A liquid crystal display according to an exemplary embodiment of the present invention includes a phase retardation film (not shown) to compensate for a delay of the liquid crystal layer 3. The liquid crystal display may include a backlight unit (not shown) for providing light to the polarizers 12 and 22, the phase retardation film, the panels 100 and 200, and the liquid crystal layer 3.

The liquid crystal layer 3 may have negative dielectric anisotropy. When an electric field is not applied, liquid crystal molecules of the liquid crystal layer 3 are oriented such that a longitudinal axis of the liquid crystal molecules is perpendicular to the surfaces of the two panels 100 and 200. Thus, light does not pass through the crossed polarizers 12 and 22 and is blocked.

A common voltage is applied to the common electrode 270 and a data voltage is applied to the pixel electrodes 191, thereby forming an electric field substantially perpendicular to the surfaces of the panels 100 and 200. The liquid crystal molecules change their directions such that the longitudinal axis of the molecules is perpendicular to the direction of the electric field in response to the electric field.

The cutout 27 of the field generating electrodes 191 and 270 and the sides of the pixel electrode 191 distort the electric field and form a horizontal element determining an inclined direction of the liquid crystal molecules 31. The horizontal element of the electric field is substantially perpendicular to the cutout 27 and the sides of the pixel electrode 191. Since the liquid crystal is inclined by the electric field formed by the four sides of the first and second sub-electrodes 9a and 9b and the cutout 27, there are four inclined directions. The viewing angle of the liquid crystal display is widened by varying the inclined directions of the liquid crystal molecules 31.

In an exemplary embodiment of the present invention, the light blocking member is formed on only the portion corresponding to a thin film transistor, and the transmittance of the liquid crystal display is increased. In Table 1, shown below, the nine points indicate nine measurement points of a liquid crystal display. Among the points, point five indicates a central portion of the liquid crystal display.

Table 1 shows transmittance of a conventional liquid crystal display having a light blocking member and a pixel electrode having sub-electrodes. Table 2 shows transmittance of a liquid crystal display according to an exemplary embodiment of the present invention.

TABLE 1

| point | black Lum. | white Lum. | C/R |
|---|---|---|---|
| 1 | 0.24 | 200.7 | 843.3 |
| 2 | 0.28 | 229.5 | 819.6 |
| 3 | 0.3 | 211.5 | 709.7 |
| 4 | 0.24 | 192.3 | 808 |
| 5 | 0.3 | 226 | 790.9 |
| 6 | 0.29 | 192.2 | 653.7 |
| 7 | 0.25 | 198.8 | 801.6 |
| 8 | 0.29 | 197.8 | 675.1 |
| 9 | 0.28 | 177.1 | 625.8 |
| nonuniformity | 20.10% | 22.80% | 25.80% |
| Avg. | 0.27 | 202.9 | 744.2 |
| 5P Avg. | 0.27 | 202.82 | 748.27 |

TABLE 2

| point | black Lum. | white Lum. | C/R |
|---|---|---|---|
| 1 | 0.26 | 215.1 | 843.5 |
| 2 | 0.32 | 247.8 | 767.2 |
| 3 | 0.27 | 227.2 | 847.8 |
| 4 | 0.25 | 207.3 | 819.4 |
| 5 | 0.31 | 242.2 | 788.9 |
| 6 | 0.32 | 207.8 | 849.4 |
| 7 | 0.26 | 212.6 | 808.4 |
| 8 | 0.27 | 212.6 | 796.3 |
| 9 | 0.29 | 190.9 | 867.5 |
| nonuniformity | 21.70% | 23.00% | 23.40% |
| Avg. | 0.28 | 218.2 | 776.5 |
| 5P Avg. | 0.28 | 217.6 | 791.21 |

Referring to Tables 1 and 2, the black luminance of a conventional liquid crystal display at point five is 0.5, while that of a liquid crystal display according to an exemplary embodiment of the present invention is 0.31. The white luminance of a conventional liquid crystal display at point five is 226, while that of a liquid crystal display according to an exemplary embodiment of the present invention has an increased value of 242.2. For example, a liquid crystal display according to an exemplary embodiment of the present invention has an increased C/R of 788.9, while a conventional liquid crystal display has a C/R of 730.9.

Figure 6:
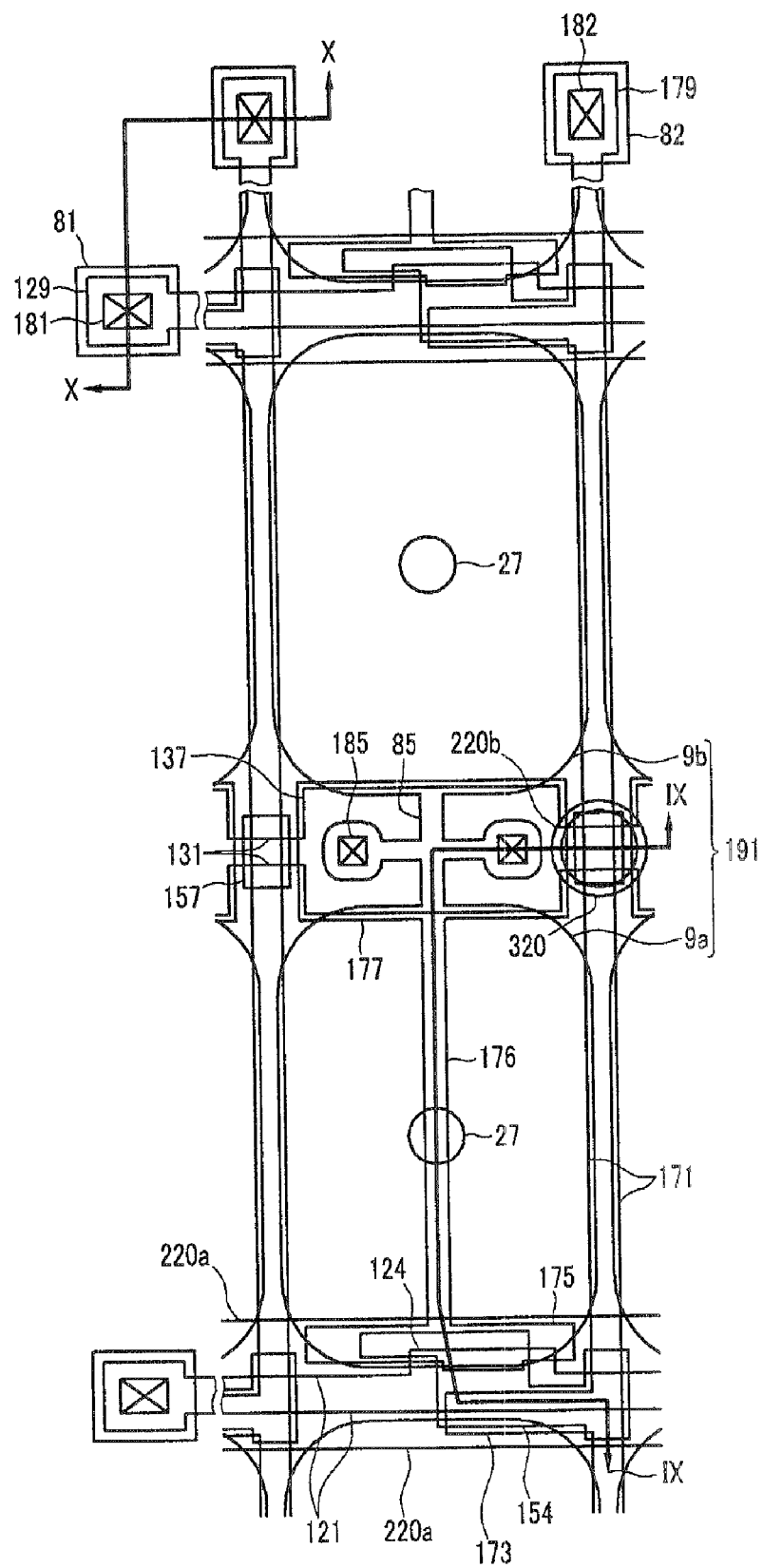
FIG. 6 is a layout view of a liquid crystal display according to an exemplary embodiment of the present invention.
Figure 7:
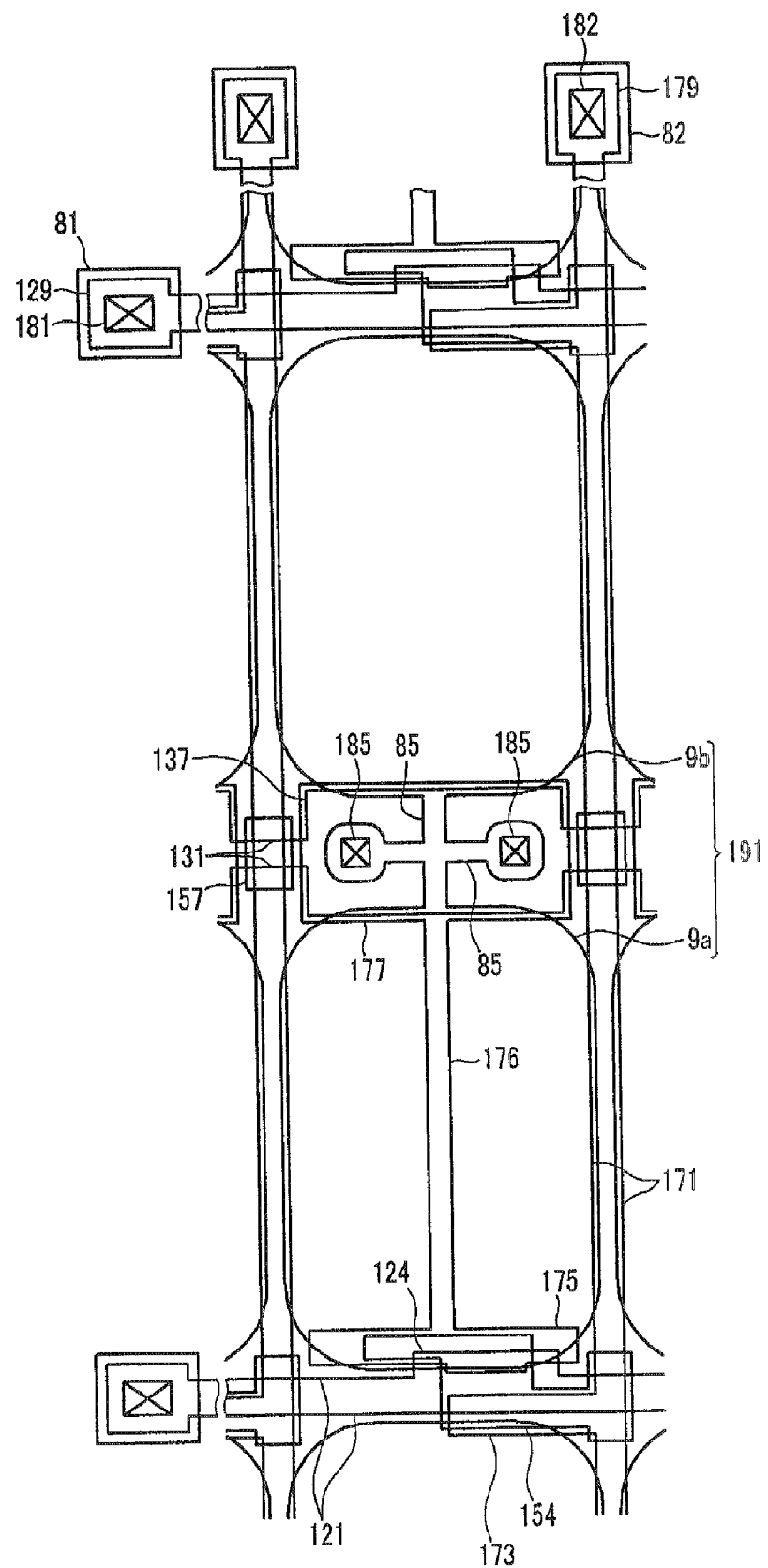
FIG. 7 is a layout view of a thin film transistor panel of the liquid crystal display shown in FIG. 6, according to an exemplary embodiment of the present invention.
Figure 8:
FIG. 8 is a layout view of a common electrode of the liquid crystal display shown in FIG. 6, according to an exemplary embodiment of the present invention.
Figure 8:
Figure 8:
Figure 8:
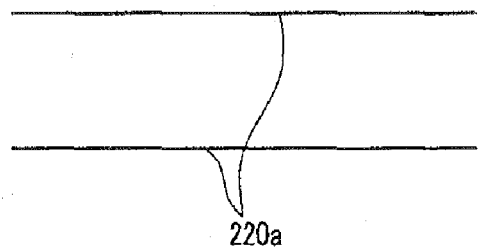
Figure 9:
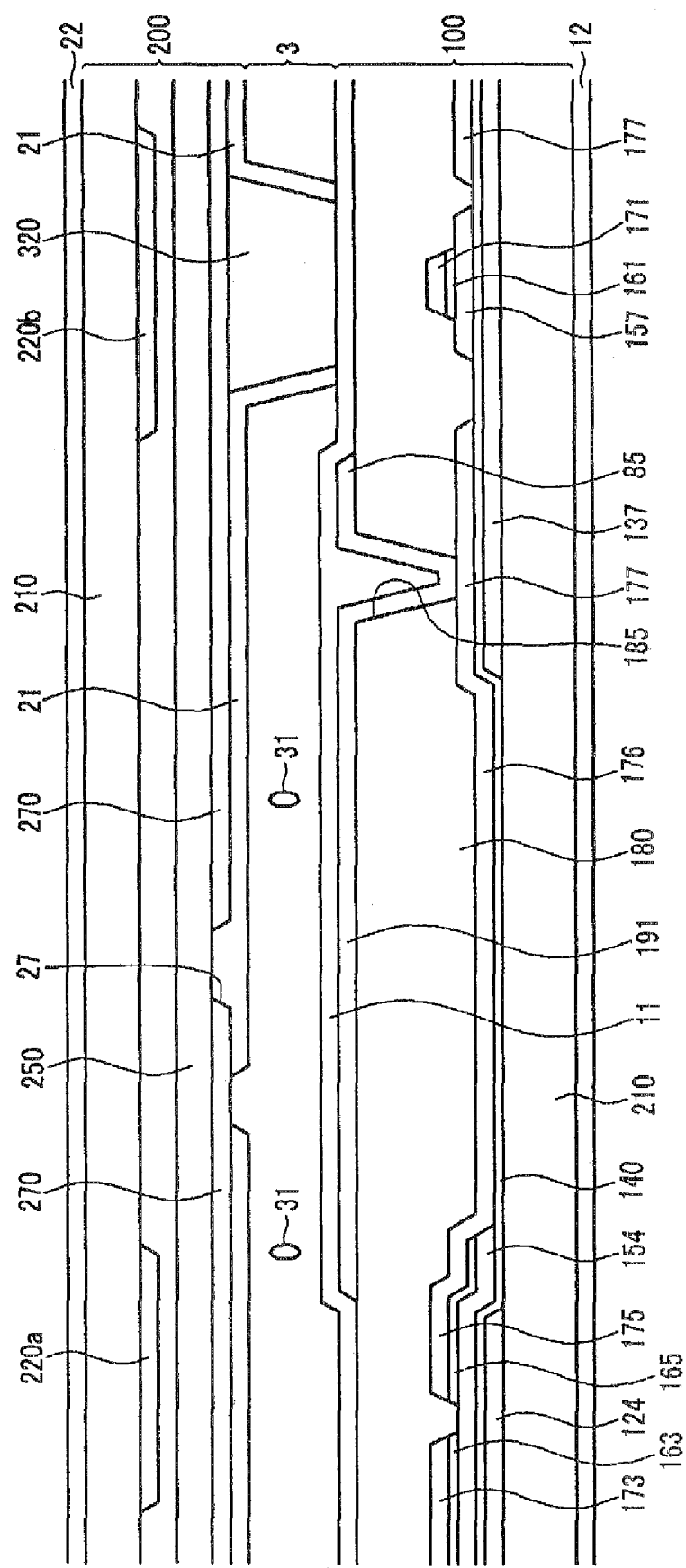
FIG. 9 is a cross-sectional view of the liquid crystal display shown in FIG. 6, taken along a line IX-IX.
Figure 10:
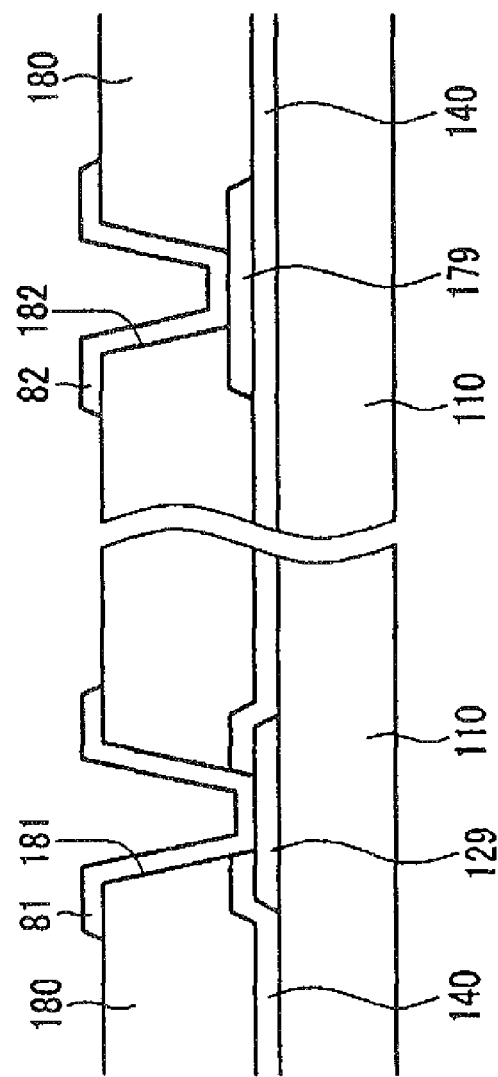
FIG. 10 is a cross-sectional view of the liquid crystal display shown in FIG. 6, taken along a line X-X.

FIG. 6 is a layout view of a liquid crystal display according to an exemplary embodiment of the present invention. FIG. 7 is a layout view of a thin film transistor panel of the liquid crystal display shown in FIG. 6, according to an exemplary embodiment of the present invention. FIG. 8 is a layout view of a common electrode of the liquid crystal display shown in FIG. 6, according to an exemplary embodiment of the present invention. FIG. 9 is a cross-sectional view of the liquid crystal display shown in FIG. 6, taken along a line IX-IX. FIG. 10 is a cross-sectional view of the liquid crystal display shown in FIG. 6, taken along a line X-X.

Referring to FIGS. 6 through 10, a liquid crystal display according to exemplary embodiments of the present invention includes a thin film transistor panel 100 and common electrode panel 200 arranged facing each other, and a liquid crystal layer 3 interposed between the panels 100 and 200.

Hereinafter a thin film transistor panel 100 according to an exemplary embodiment of the present invention will be described with reference to FIGS. 6, 7, 9 and 10.

Referring to FIG. 6, FIG. 7, FIG. 9, and FIG. 10, a plurality of gate lines 121 and a plurality of storage electrode lines 131 are formed on an insulation substrate 110 formed of transparent glass or plastic.

Each gate line 121 transfers gate signals and may extend substantially horizontally. Each gate line 121 has a plurality of gate electrodes 124 protruding upwardly and an enlarged end portion 129 for providing electrical connection to other layers or an external driving circuit. A gate driving circuit (not shown) for generating the gate signal may be installed on a flexible printed circuit film (not shown) attached on the substrate 110, may be directly installed on the substrate 110, or may be integrated on the substrate 110. In the case that the gate driving circuit is directly integrated on the substrate 110, the gate line 121 may extend and electrically connect to the gate driving circuit directly.

The storage electrode lines 131 are supplied with a predetermined voltage and may extend substantially in parallel with the gate lines 121.

Each of the storage electrode lines 131 include storage electrode 137.

The side surface of the gate lines 121 and the storage electrode lines 131 are inclined with respect to the surface of the substrate 110, and the inclined angle may be about 30° to about 80°.

A gate insulating layer 140 is formed on the gate lines 121 and on storage electrode lines 131. The gate insulating layer 140 may comprise silicon nitride (SiNx) and/or silicon oxide (SiOx).

A plurality of semiconductor islands 154 and 157 are formed on the gate insulating layer 140, and may comprise, for example, hydrogenated amorphous silicon (where amorphous silicon is abbreviated as a-Si) or polysilicon. A semiconductor island 154 is disposed on the gate electrode 124. A semiconductor island 157 overlaps with the storage electrode line 131.

A plurality of ohmic contact island members 163 and 165 are formed on the semiconductor 154. The ohmic contact members 163 and 165 may be formed from materials such as silicide, or n+ hydrogenated amorphous silicon on which an n-type impurity such as phosphorus is doped in a high concentration. The ohmic contact members 163 and 165 form a pair. Each pair of the ohmic contact members 163 and 165 is respectively disposed on the semiconductor 154. An ohmic contact island member 167 may be formed on a portion of the semiconductor island 157 that overlaps with the storage electrode line 131.

The side surfaces of the semiconductors 154 and 157 and ohmic contact members 163 and 165 may be inclined with respect to the surface of the substrate 110, and the inclined angle may be about 30° to about 80°.

A plurality of data lines 171 and a plurality of drain electrodes 175 are formed on the ohmic contact members 163 and 165 and the gate insulating layer 140.

Each data line 171 transfers a data signal and may extend in a substantially vertical direction, while intersecting the gate lines 121 and the storage electrode lines 131. Each data line 171 includes a plurality of source electrodes 173 extending toward the gate electrodes 124 and an enlarged end portion 179 for providing electrical connection to another layer or an external driving circuit. A data driving circuit (not shown) for generating the data signal may be installed on a flexible printed circuit film (not shown) attached on the substrate 110, may be directly installed on the substrate 110, or may be integrated on the substrate 110. In the case that the data driving circuit is directly integrated in the substrate 110, the data line 171 may extend and electrically connect to the data driving circuit.

The drain electrode 175 is disposed separated from the data line 171 and arranged facing the source electrode 173 with the gate electrode 124 therebetween. The drain electrode 175 is electrically connected to a connecting member 176 and an extending portion 177 overlapping with a storage electrode 137. A gate electrode 124, source electrode 173, and drain electrode 175, along with the semiconductor 154, form one thin film transistor (TFT). The thin film transistor includes a channel formed on the semiconductor 154 between the source electrode 173 and the drain electrode 175.

The side surfaces of the data line 171 and drain electrode 175 may be inclined with respect to the surface of the substrate 110, and the inclined angle may be about 30° to about 80°.

In an exemplary embodiment of the present invention, the ohmic contact members 163 and 165 are formed only between the semiconductor 154 at the lower side and the data line 171 and drain electrodes 175 at the upper side and may reduce contact resistance between them. The widths of the semiconductor islands 154 and 157 are enlarged at a portion meeting the gate line 121 and the storage electrode line 131, and a surface profile thereof may be smooth, and shorts of the data line 171 may be prevented. The semiconductor 154 has exposed portions, for example an exposed portion between the source electrode 173 and the drain electrode 175 or an exposed portion that is not covered by the data line 171 and the drain electrode 175.

A passivation layer 180 is formed on the data line 171 the drain electrode 175, and the exposed portion of the semiconductor 154.

The passivation layer 180 may be formed from an inorganic insulating material or an organic insulating material, and may be substantially flat.

A plurality of contact holes 182 and 185 for exposing the end portions 179 of the data lines 171 and the drain electrodes 175, respectively are formed on the passivation layer. A plurality of contact holes 181 for exposing the end portions 129 of the gate lines 121 are formed on the passivation layer 180 and the gate insulating layer 140.

A plurality of pixel electrodes 191, a plurality of connecting members 85, and a plurality of contact assisting members 81 and 82 are formed on the passivation layer 180. The pixel electrodes 191 may comprise, for example, indium zinc oxide (IZO) and/or indium tin oxide (ITO).

Each pixel electrode 191 includes first and second sub-electrodes 9a and 9b. In an exemplary embodiment of the present invention, the first and second sub-electrodes 9a and 9b have rounded corners of quadrangles. The first and second sub-electrodes 9a and 9b are connected to each other by a connecting member 85.

The connecting member 85 may include a substantially vertical portion connecting the first and second sub-electrodes 9a and 9b and a protruding portion leftwardly and rightwardly protruded from the substantially vertical portion.

The protruding portion of the connecting member 85, which may be physically and electrically connected to the extending portion 177 through the contact hole 185, receives a data voltage from the drain electrode 175 to transfer the data voltage to the pixel electrode 191.

The pixel electrodes 191 to which the data voltage is applied, along with the common electrode 270 of the common electrode panel 200 to which a common voltage is applied, form an electric field, thereby determining the orientation of the liquid crystal molecules of the liquid crystal layer 3 interposed between the electrodes 191 and 270.

The distance between adjacent pixel electrodes 191 may be about 4 μm to about 7 μm. When the distance between the pixel electrodes 191 is greater than about 4 μm, light leakage due to disclination may be reduced. The disclination may occur due to a fringe field between the pixel electrodes.

The contact assisting members 81 and 82 are connected to the end portion 129 of the gate line 121 and the end portion 179 of the data line 171 through the contact holes 181 and 182, respectively. The contact assisting members 81 and 82 may compensate for adhesiveness of the end portions 129 of the gate lines 121 and the end portions 179 of the data lines 171 to external apparatuses and may protect these portions.

Hereinafter a common electrode panel 200 according to an exemplary embodiment of the present invention will be described with reference to FIGS. 6, 8, 9 and 10.

Referring to FIG. 6, FIG. 8 to FIG. 10, a light blocking member 220 is formed on an insulation substrate 210. The insulation substrate 210 may comprise transparent glass or plastic. The light blocking member 220, which may comprise a black matrix, is formed such that it covers around the gate line 121 on which the thin film transistor is disposed.

A plurality of color filters 230 are formed on the substrate 210. Each color filter 230 extends in a substantially vertical direction along the pixel electrode 191 and forms a stripe pattern. Each color filter 230 may represent one of three primary colors, such as red, green, and blue.

An overcoat 250 is formed on the color filters 230. The overcoat 250 may be formed from an (organic) insulating material. The overcoat 250 may prevent the color filter 230 from being exposed, and it may provide a substantially even surface.

The common electrode 270 is formed on the overcoat 250. The common electrode 270 may be formed from a transparent conductor, such as for example, ITO and/or IZO.

A plurality of cutouts 27 are formed on the common electrode 270. Each cutout 27 corresponds to central portions of the sub-electrodes 9a and 9b. The cutout 27 may have a rounded shape or a quadrangle shape having rounded corners, for example, similar to a shape of the sub-electrodes 9a and 9b according to an exemplary embodiment of the present invention.

A spacer for maintaining a predetermined distance between the panels 100 and 200 may be formed on the common electrode 270.

Although an exemplary embodiment of the present invention illustrates a column spacer 320, a bead spacer (not shown) may be used. In the case that the column spacer 320 is adopted, an assistant light blocking member 220b may be formed on a portion corresponding to column spacer 320. The width of the assistant light blocking member 220b may be about 8 μm to about 10 μm greater than the largest width of the column spacer 320. The assistant tight blocking member may be omitted in the case that a bead-type spacer is adopted.

The column spacer 320 may be formed on an overlapped portion of the storage electrode line 131 and the data line 171.

Alignment layers 11 and 21 are deposited inside of the panels 100 and 200, respectively. The alignment layers 11 and 21 may be vertical alignment layers. Polarizers 12 and 22 are installed outside of the panels 100 and 200, respectively. The polarization axes of the two polarizers 12 and 22 are perpendicular to each other.

In an exemplary embodiment of the present invention, a liquid crystal display includes a phase retardation film (not shown) to compensate for a delay of the liquid crystal layer 3. The liquid crystal display may include a backlight unit (not shown) for providing light to the polarizers 12 and 22, the phase retardation film, the panels 100 and 200, and the liquid crystal layer 3.

The liquid crystal layer 3 may have negative dielectric anisotropy. When an electric field is not applied to the liquid crystal layer 3, liquid crystal molecules of the liquid crystal layer 3 are oriented such that a longitudinal axis of the liquid crystal molecules is perpendicular to the surfaces of the two panels 100 and 200. Thus, light does not pass through the crossed polarizers 12 and 22 and is blocked.

In an exemplary embodiment of the present invention the light blocking member is formed only around the gate line 121, and the transmittance of the liquid crystal display may be increased.

Table 3 shows transmittance of a conventional liquid crystal display having a light blocking member and a pixel electrode having sub-electrodes. Table 4 shows transmittance of a liquid crystal display according to an exemplary embodiment of the present invention.

TABLE 3

| sample No. | color gamut(%) | transmittance(%) |
|---|---|---|
| #1 | 46.8 | 6.34 |
| #2 | 47.1 | 6.34 |
| #3 | 46.5 | 6.31 |
| AVG. | 46.8 | 6.3 |

TABLE 4

| sample No. | color gamut(%) | transmittance(%) |
|---|---|---|
| #1 | 46.6 | 6.54 |
| #2 | 45.9 | 6.59 |
| #3 | 46.8 | 6.49 |
| AVG. | 46.4 | 6.5 |

Referring to Table 3 and Table 4, a liquid crystal display according to an exemplary embodiment of the present invention in which a light blocking member is formed has transmittance of 65%, while a conventional liquid crystal display has transmittance of 63%.

In an exemplary embodiment of the present invention, a light blocking member is formed only on a region corresponding to a thin film transistor or a gate line, and an aperture ratio or transmittance of a liquid crystal display may be increased.

A liquid crystal display according to an exemplary embodiment of the present invention has an enlarged viewing angle, and includes sub-electrodes having a quadrangle shape and a cutout of a common electrode.

Although exemplary embodiments of the present invention have been described in detail with reference to the accompanying drawings for the purpose of illustration, it is to be understood that the inventive processes and devices should not be construed as limited thereby. It will be readily apparent to those of reasonable skill in the art that various modifications to the foregoing exemplary embodiments can be made therein without departing from the scope of the invention as defined by the appended claims, with equivalents of the claims to be included therein.

What is claimed is:

1. A liquid crystal display comprising:
   a first substrate;
   a gate line disposed on the first substrate;
   a data line disposed on the first substrate;
   a thin film transistor electrically connected to the gate line and to the data line;
   a pixel electrode electrically connected to the thin film transistor, including first and second sub-electrodes, and overlapping with a portion of the data line;
   a storage electrode line formed on the first substrate, disposed between the first and second sub-electrodes, and including an overlapped portion with the pixel electrode;

a second substrate arranged facing the first substrate;
a light blocking member disposed on the second substrate;
a common electrode formed on the second substrate and including a cutout corresponding to the first and second sub-electrodes; and
a liquid crystal layer formed between the common electrode and the pixel electrode,
wherein the thin film transistor includes:
a gate electrode electrically connected to the gate line;
a semiconductor overlapping with the gate electrode;
a drain electrode formed on the semiconductor; and
a source electrode arranged facing the drain electrode and electrically connected to the data line, on the semiconductor;
wherein the drain electrode includes an extending portion overlapping with the storage electrode line;
wherein the first and second sub-electrodes are connected to each other by a connecting member, and the connecting member includes a substantially vertical portion connecting the first and second sub-electrodes in a row and a protruding portion leftwardly and rightwardly protruded from the substantially vertical portion and electrically connected to the extending portion of the drain electrode.

2. The liquid crystal display of claim 1, wherein a shape of the first and second sub-electrodes is a quadrangle shape having rounded corners.

3. The liquid crystal display of claim 1, wherein the light blocking member corresponds to the thin film transistor.

4. The liquid crystal display of claim 1, wherein the light blocking member corresponds to the gate line.

5. The liquid crystal display of claim 1, further comprising a column spacer formed on the second substrate and supporting the first and second substrates.

6. The liquid crystal display of claim 5, further comprising an assistant light blocking member corresponding to the column spacer and formed on the second substrate.

7. The liquid crystal display of claim 6, wherein a width of the assistant light blocking member is about 8 µm to about 10 µm greater than a largest width of the column spacer.

8. The liquid crystal display of claim 5, wherein the column spacer is disposed on a portion in which the storage electrode line and the data line are intersected.

9. The liquid crystal display of claim 1, further comprising a plurality of color filters disposed under the common electrode.

10. The liquid crystal display of claim 1, wherein an area of the first sub-electrode is substantially identical to an area of the second sub-electrode.

11. The liquid crystal display of claim 1, wherein a distance between adjacent pixel electrodes is about 4 µm to about 7 µm.

12. A liquid crystal display comprising:
a thin film transistor panel;
a common electrode panel arranged facing the thin film transistor panel; and
a liquid crystal layer formed between the common electrode panel and the thin film transistor panel,
wherein the thin film transistor panel includes a first substrate, a gate line disposed on the first substrate, a data line disposed on the first substrate, a thin film transistor electrically connected to the gate line and to the data line, and a pixel electrode electrically connected to the thin film transistor and including first and second sub-electrodes,
wherein the common electrode panel includes a second substrate arranged facing the first substrate, a light blocking member disposed on the second substrate, and a common electrode disposed on the second substrate and including a cutout corresponding to the first and second sub-electrodes, and
wherein the thin film transistor includes:
a gate electrode electrically connected to the gate line;
a semiconductor overlapping with the gate electrode;
a drain electrode formed on the semiconductor; and
a source electrode arranged facing the drain electrode and electrically connected to the data line, on the semiconductor;
wherein the drain electrode includes an extending portion overlapping with the storage electrode line;
wherein the first and second sub-electrodes are connected to each other by a connecting member, and the connecting member includes a substantially vertical portion connecting the first and second sub-electrodes in a row and a protruding portion leftwardly and rightwardly protruded from the substantially vertical portion and electrically connected to the extending portion of the drain electrode.

13. The liquid crystal display of claim 12, further comprising a storage electrode line formed on the first substrate, disposed between the first and second sub-electrodes, and including an overlapped portion with the pixel electrode.

14. The liquid crystal display of claim 12, wherein the light blocking member corresponds to the thin film transistor.

15. The liquid crystal display of claim 12, wherein the light blocking member corresponds to the gate line.

* * * * *